United States Patent
Aamer et al.

(10) Patent No.: US 9,630,151 B2
(45) Date of Patent: Apr. 25, 2017

(54) HYDROPHILICALLY MODIFIED FLUORINATED MEMBRANE (V)

(71) Applicant: PALL CORPORATION, Port Washington, NY (US)

(72) Inventors: Khaled Abdel-Hakim Helmy Aamer, Port Washington, NY (US); Hassan Ait-Haddou, Melville, NY (US)

(73) Assignee: Pall Corporation, Port Washington, NY (US)

( * ) Notice: Subject to any disclaimer, the term of this patent is extended or adjusted under 35 U.S.C. 154(b) by 261 days.

(21) Appl. No.: 14/675,592

(22) Filed: Mar. 31, 2015

(65) Prior Publication Data
US 2016/0288060 A1 Oct. 6, 2016

(51) Int. Cl.
*B01D 71/80* (2006.01)
*B01D 67/00* (2006.01)
(Continued)

(52) U.S. Cl.
CPC ....... *B01D 69/125* (2013.01); *B01D 67/0006* (2013.01); *B01D 67/0093* (2013.01);
(Continued)

(58) Field of Classification Search
None
See application file for complete search history.

(56) References Cited

U.S. PATENT DOCUMENTS

| 4,113,912 A | 9/1978 | Okita |
| 4,136,237 A | 1/1979 | Takahashi et al. |

(Continued)

FOREIGN PATENT DOCUMENTS

| CN | 1926081 A | 3/2007 |
| CN | 102423642 A | 4/2012 |

(Continued)

OTHER PUBLICATIONS

European Patent Office, Extended European Search Report in European Patent Application No. 15192121.0 (Aug. 24, 2016).

(Continued)

*Primary Examiner* — Krishnan S Menon
(74) *Attorney, Agent, or Firm* — Leydig, Voit & Mayer, Ltd.

(57) ABSTRACT

Disclosed are copolymers suitable for hydrophilically modifying the surface of fluoropolymer porous membranes, for example, a copolymer of the formula:

(Continued)

US 9,630,151 B2
Page 2

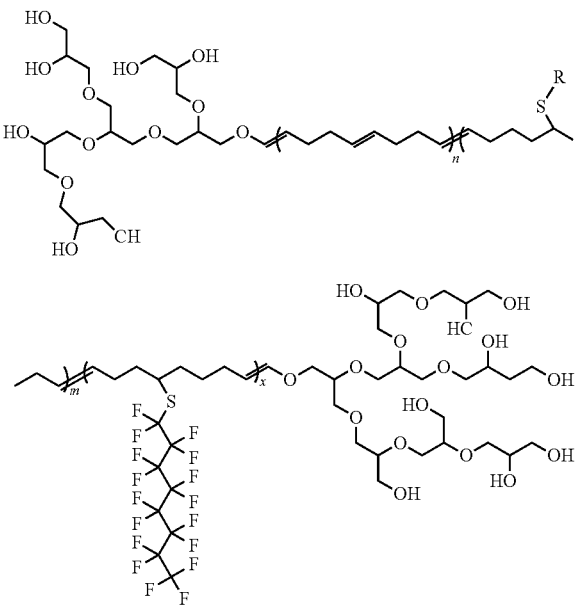

wherein R, n, m, and x are as defined herein. Also disclosed are a method of preparing the copolymers, a method of hydrophilically modifying porous fluoropolymer supports, and composite hydrophilic fluoropolymer porous membranes prepared from the copolymers.

15 Claims, 1 Drawing Sheet

(51) Int. Cl.
B01D 71/44 (2006.01)
B01D 71/32 (2006.01)
B01D 69/12 (2006.01)
B01D 69/10 (2006.01)
B01D 71/26 (2006.01)

(52) U.S. Cl.
CPC ......... B01D 67/0095 (2013.01); B01D 69/10 (2013.01); B01D 71/26 (2013.01); B01D 71/32 (2013.01); B01D 71/44 (2013.01); B01D 71/80 (2013.01); B01D 2323/02 (2013.01); B01D 2323/30 (2013.01); B01D 2323/345 (2013.01); B01D 2323/36 (2013.01); B01D 2323/40 (2013.01); B01D 2325/36 (2013.01)

(56) References Cited

U.S. PATENT DOCUMENTS

| | | |
|---|---|---|
| 4,975,507 A | 12/1990 | Asrar |
| 5,117,327 A | 5/1992 | Asrar et al. |
| 5,200,470 A | 4/1993 | Asrar |
| 5,219,662 A | 6/1993 | Grimminger et al. |
| 5,294,493 A | 3/1994 | Beckerbauer et al. |
| 5,418,277 A | 5/1995 | Ma et al. |
| 6,080,826 A | 6/2000 | Grubbs et al. |
| 6,303,725 B1 | 10/2001 | Chang et al. |
| 6,313,222 B1 | 11/2001 | Lin et al. |
| 6,436,476 B1 | 8/2002 | Sage, Jr. |
| 6,492,443 B1 | 12/2002 | Kodemura et al. |
| 6,653,424 B1 | 11/2003 | Sakamoto et al. |
| 6,677,418 B1 | 1/2004 | Feast et al. |
| 6,987,154 B2 | 1/2006 | Choi et al. |
| 7,232,917 B2 | 6/2007 | Sumida et al. |
| 7,514,499 B2 | 4/2009 | Tam et al. |
| 8,143,369 B2 | 3/2012 | Fujiwara et al. |
| 8,223,472 B1 | 7/2012 | Dirk et al. |
| 8,283,410 B2 | 10/2012 | Musa |
| 8,410,290 B2 | 4/2013 | Fujiwara et al. |
| 8,431,625 B2 | 4/2013 | Luchterhandt et al. |
| 8,678,203 B2 | 3/2014 | Knapp et al. |
| 8,883,925 B2 | 11/2014 | Kizu et al. |
| 2008/0234451 A1 | 9/2008 | Kenwright et al. |
| 2009/0023877 A1 | 1/2009 | Liaw et al. |
| 2009/0030175 A1 | 1/2009 | Yamamoto et al. |
| 2009/0043059 A1 | 2/2009 | Liaw et al. |
| 2009/0182117 A1 | 7/2009 | Takeyama et al. |
| 2009/0188857 A1 | 7/2009 | Moore et al. |
| 2009/0264608 A1 | 10/2009 | Wakatsuki et al. |
| 2009/0269601 A1 | 10/2009 | Ishiguro et al. |
| 2009/0275719 A1 | 11/2009 | Ishiguro et al. |
| 2011/0266220 A1 | 11/2011 | Campos et al. |
| 2012/0041137 A1 | 2/2012 | Musa et al. |
| 2012/0214940 A1 | 8/2012 | Hsu et al. |
| 2012/0245271 A1 | 9/2012 | Pawlow et al. |
| 2013/0004690 A1 | 1/2013 | Mikhael et al. |
| 2013/0281644 A1 | 10/2013 | Kiessling et al. |
| 2013/0292872 A1 | 11/2013 | Knapp et al. |
| 2014/0357820 A1 | 12/2014 | Stephen et al. |

FOREIGN PATENT DOCUMENTS

| | | |
|---|---|---|
| EP | 0 190 558 A2 | 8/1986 |
| EP | 1769841 A1 | 4/2007 |
| EP | 2157430 A1 | 2/2010 |
| EP | 2 889 077 A1 | 7/2015 |
| IT | 20130096 A1 | 3/2015 |
| JP | S61249503 A | 11/1986 |
| JP | H08283447 A | 10/1996 |
| JP | 2010-059427 A | 3/2010 |
| JP | 2011-131208 A | 7/2011 |
| WO | WO 93/15255 | 8/1993 |
| WO | WO 96/03202 A1 | 7/1995 |
| WO | WO 98/01208 A1 | 1/1998 |
| WO | WO 00/72941 | 12/2000 |
| WO | WO 2004/022201 A1 | 3/2004 |
| WO | WO 2006/058384 A1 | 6/2006 |
| WO | WO 2010/117460 A1 | 10/2010 |
| WO | WO 2012/136688 A1 | 10/2012 |
| WO | WO 2014/034053 A1 | 3/2014 |

OTHER PUBLICATIONS

Taiwan Intellectual Property Office, Examination Report in Taiwanese Patent Application No. 104135568 (Oct. 27, 2016) 6pp.
Intellectual Property Office of Singapore, Search Report in Singapore Patent Application No. 10201508801P (Feb. 10, 2016).
Japanese Patent Office, Notice of Reasons for Rejection issued in Japanese Patent Application No. 2015-209921 (Nov. 15, 2016) 5 pp.
U.S. Appl. No. 14/675,547, filed Mar. 31, 2015.
U.S. Appl. No. 14/675,562, filed Mar. 31, 2015.
U.S. Appl. No. 14/675,585, filed Mar. 31, 2015.
U.S. Appl. No. 14/700,952, filed Apr. 30, 2015.
U.S. Appl. No. 14/675,528, filed Mar. 31, 2015.

HYDROPHILICALLY MODIFIED FLUORINATED MEMBRANE (V)

BACKGROUND OF THE INVENTION

The properties of porous fluoropolymer membranes, for example, PTFE membrane, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as BBUV and plasma. Though the exact mechanism of these surface modification approaches is not reported, it likely results from the formation of free radicals by bond scission since C—C bond strength is known to be ~40% lower than F—F bond. If a majority of the radicals result from C—C scission or main polymer chain scission, it could decrease the mechanical and the chemical stability of the PTFE membrane. It is also known that plasma treatment is limited to the surface of the membrane which makes it less stable during a long period of time.

The foregoing shows that there exists an unmet need for a surface modification of porous fluoropolymer supports to provide hydrophilic fluoropolymer membranes which are stable, and wherein the surface modification does not significantly affect the mechanical strength of the fluoropolymer support or the resulting membrane.

BRIEF SUMMARY OF THE INVENTION

The invention provides a composite hydrophilic porous membrane comprising a porous fluoropolymer support and a coating comprising a crosslinked polymer network, wherein the composite hydrophilic membrane is produced by coating the porous fluoropolymer support with a coating composition comprising a solvent, a crosslinking agent, a photoinitiator, and a telechelic polymer comprising a backbone made of polymerized 1,5-cyclooctadiene repeat units, wherein at least one of the repeat units comprises a pendant hydrophilic group attached thereto and at least another one of the repeat units comprises a pendant fluorinated hydrophobic group attached thereto, and crosslinking in situ the resulting coating.

The copolymer and the modified homopolymer are useful in modifying the surface of fluoropolymer membranes.

The present invention further provides methods of preparing the telechelic polymer, and methods of preparing hydrophilically modified fluoropolymer membranes.

BRIEF DESCRIPTION OF THE SEVERAL VIEWS OF THE DRAWING(S)

DETAILED DESCRIPTION OF THE INVENTION

Figure 1:
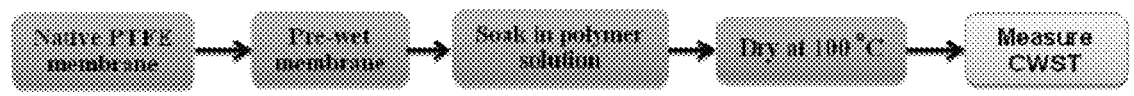
FIG. 1 illustrates a process for coating the hydrophilic fluorinated polymer in accordance with an embodiment of the invention.

In accordance with an embodiment, the invention provides a composite hydrophilic porous membrane comprising a porous fluoropolymer support and a coating comprising a crosslinked polymer network, wherein the composite hydrophilic membrane is produced by coating the porous fluoropolymer support with a coating composition comprising a solvent, a crosslinking agent, a photoinitiator, and a telechelic polymer comprising a backbone made of polymerized 1,5-cyclooctadiene repeat units wherein at least one of said repeat units comprises a pendant hydrophilic group attached thereto and at least another one of said repeat units comprises a pendant fluorinated hydrophobic group attached thereto, and crosslinking in situ the resulting coating.

The end groups of the telechelic polymer can be hydrophobic and/or hydrophilic terminal. In an embodiment, the end groups are hydrophobic. In another embodiment, the end groups are hydrophilic.

In accordance with an embodiment, the telechelic polymer comprises at least one of the repeat units B and C, and optionally one or more repeat units A, wherein the repeat units A-C are of the formulae:

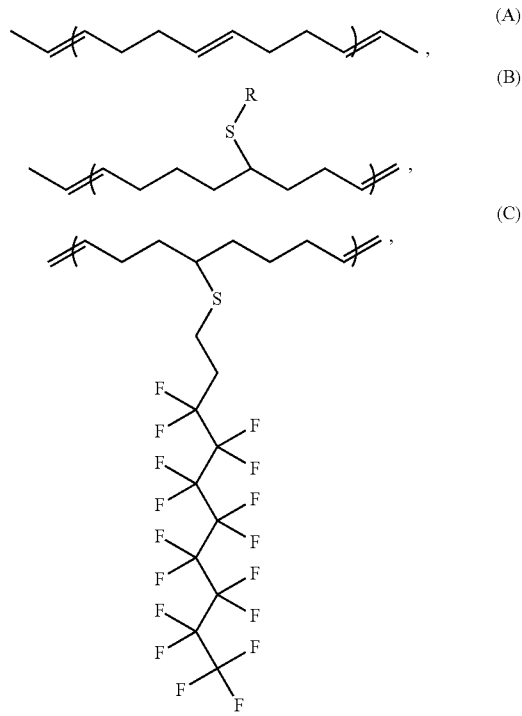

wherein R is a hydrophilic group.

In the above embodiment, the hydrophilic group R is selected from carboxy alkyl, sulfonic alkyl, and hydroxyalkyl groups.

In embodiments of the invention, units A, B, and/or C can be present in any suitable manner, for example, as blocks, or randomly distributed blocks.

In an embodiment, the telechelic polymer comprises units A, B, and C. For example, the telechelic polymer is of the formula:

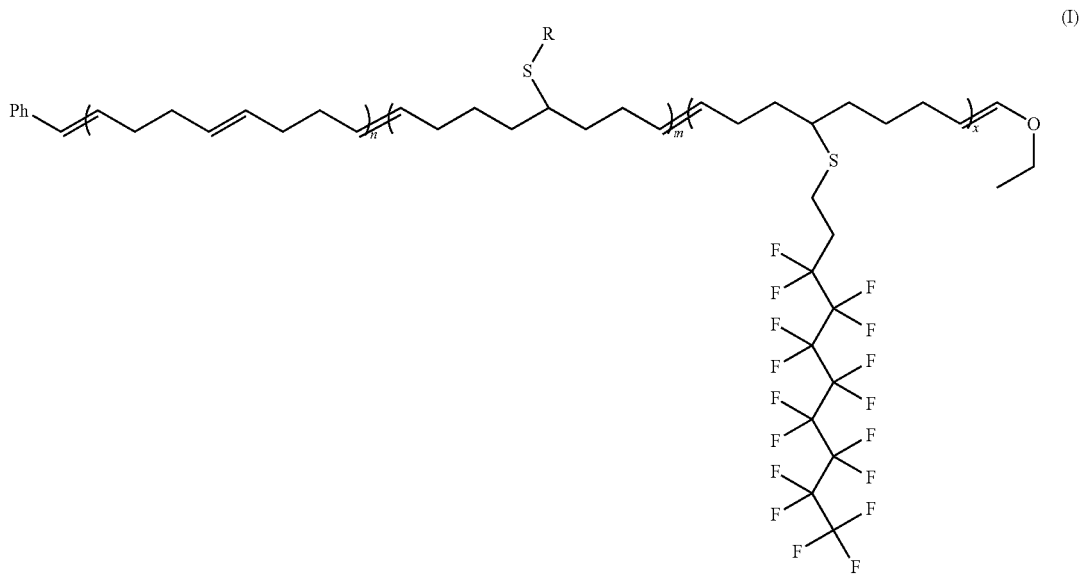

(I)

wherein x and m are individually 0 to 35 mole % of n+m+x, wherein n+m+x=from 10 to 1000, n and m are individually from about 10 to about 1000, and R is a hydrophilic group.

In an embodiment, the telechelic polymer comprises hydrophilic terminal end groups. For example, the hydrophilic terminal end groups comprise polyhydroxyalkyl ether groups.

In an embodiment, the telechelic polymer has the following formula:

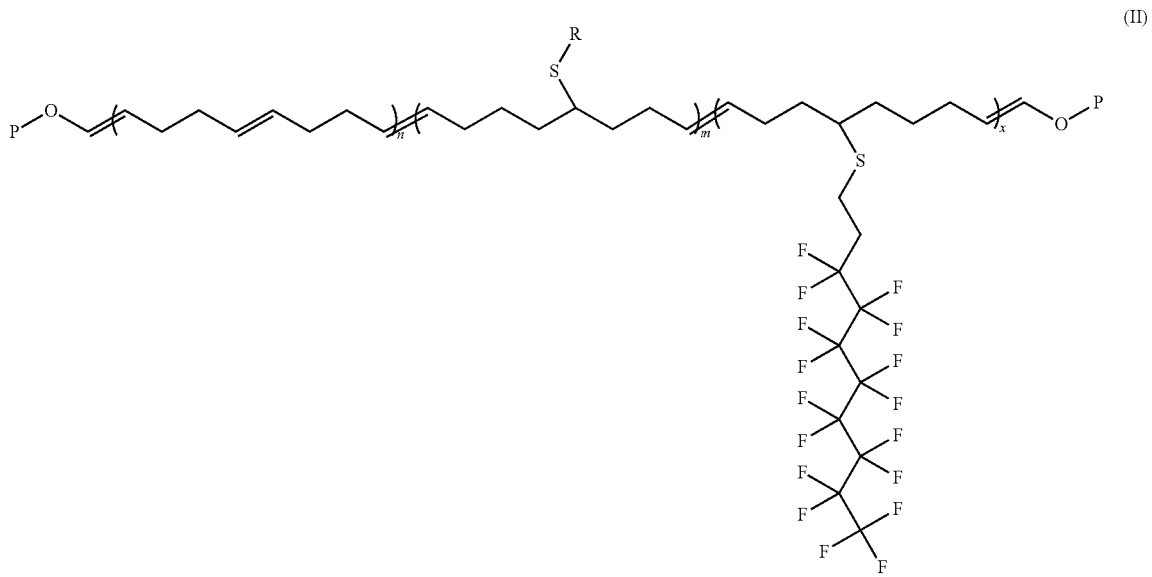

(II)

wherein R is a hydrophilic group, for example, carboxy alkyl, sulfonic alkyl, or hydroxyalkyl group, and n is from about 10 to about 1000, wherein P is a group capable of initiating polymerization.

In an embodiment, the telechelic polymer is of the formula:

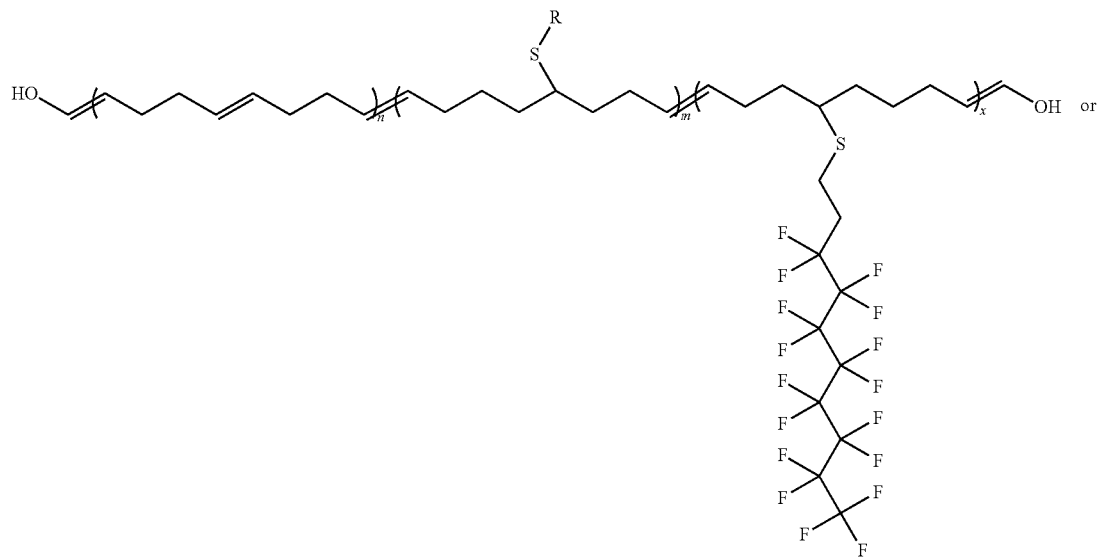

(III)

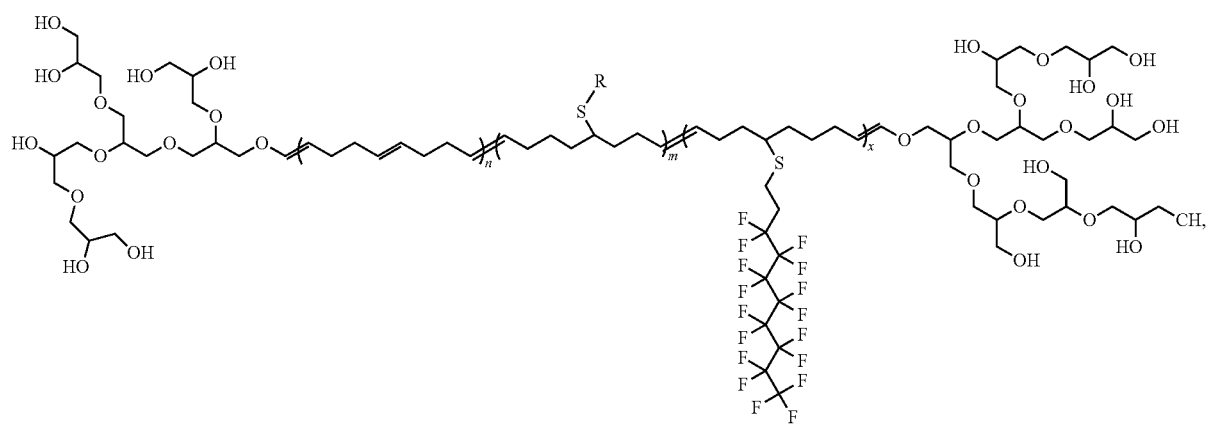

(IV)

wherein P is a group capable of initiating polymerization, x and m are individually 0 to 35 mole % of n+m+x, wherein n+m+x=from 10 to 1000, and R is a hydrophilic group.

The telechelic polymer can be crosslinked by any suitable crosslinking agent, preferably by a bithiol or a multithiol.

Any suitable photoinitiator can be employed, for example, a photoinitiator selected from camphor quinone, benzophenone, benzophenone derivatives, acetophenone, acetophenone derivatives, phosphine oxides and derivatives, benzoin alkyl ethers, benzil ketals, phenylglyoxalic esters and derivatives thereof, dimeric phenylglyoxalic esters, peresters, halomethyltriazines, hexaarylbisimidazole/coinitiators systems, ferrocenium compounds, titanocenes, and combinations thereof.

Any suitable porous fluoropolymer support can be hydrophilically modified, for example, the porous fluoropolymer support can be selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

In accordance with an embodiment, the crosslinking of the coating is carried by exposing the coating to UV radiation.

The present invention further provides a telechelic polymer of the formula:

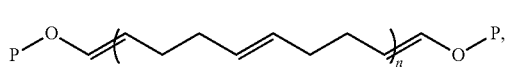

(V)

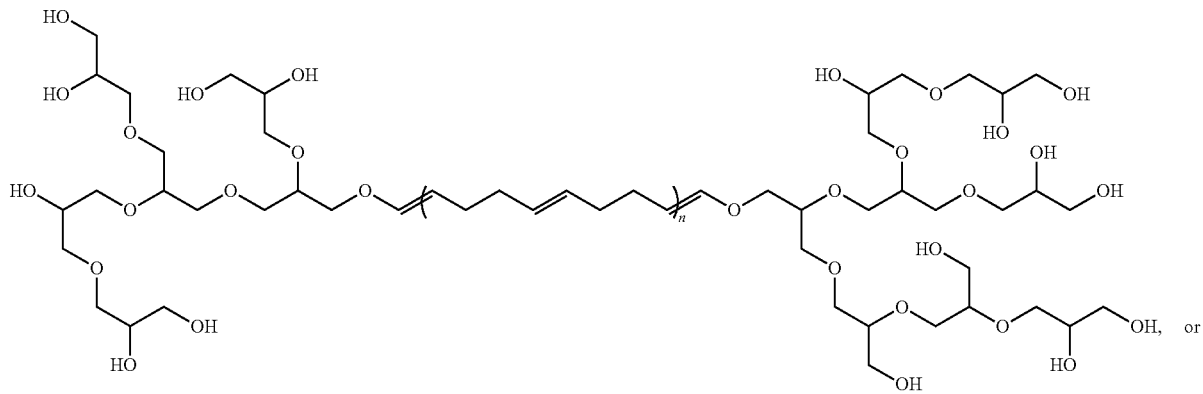

(VI)

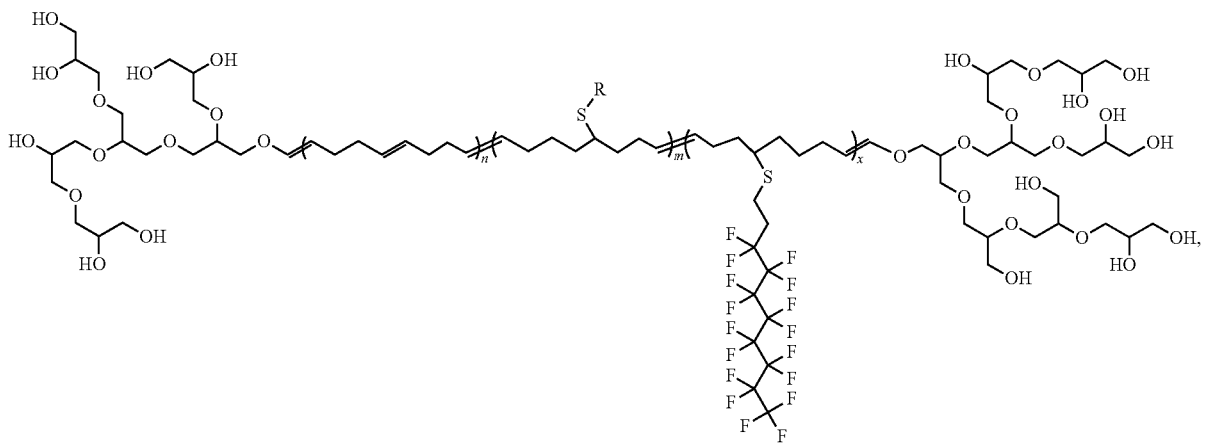

(VII)

wherein P is a group capable of initiating polymerization, x and m are individually 0 to 35 mole % of n+m+x, wherein n+m+x=from 10 to 1000, and R is a hydrophilic group.

The present invention further provides a method of hydrophilically modifying a porous fluoropolymer support comprising:

(i) providing a porous fluoropolymer support;
(ii) coating the porous fluoropolymer support with a solution comprising a solvent, a crosslinking agent, a photoinitiator, and a telechelic polymer as described above;
(iii) drying the coated fluoropolymer support from (ii) to remove at least some of the solvent from the coated solution; and
(iv) crosslinking said telechelic polymer present in the coating.

The present invention further provides a hydrophilically modified fluoropolymer membrane produced by the method described above.

The present invention further provides a method of filtering a fluid, the method comprising passing the fluid through any of the composite hydrophilic porous membranes described above.

The telechelic polymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

The telechelic polymer of the invention can be prepared by any suitable method, for example, through ring opening metathesis polymerization of 1,5-cylooctadiene (COD). Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

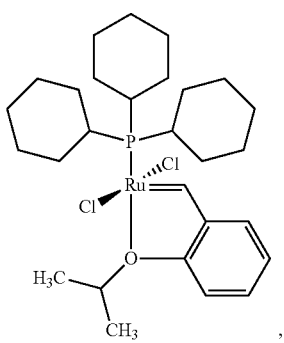

,

-continued
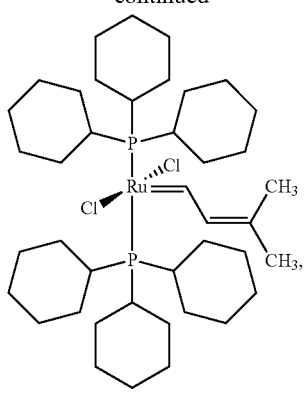
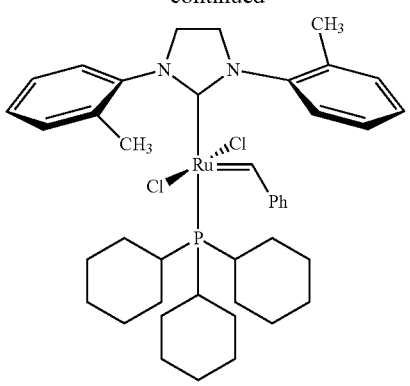
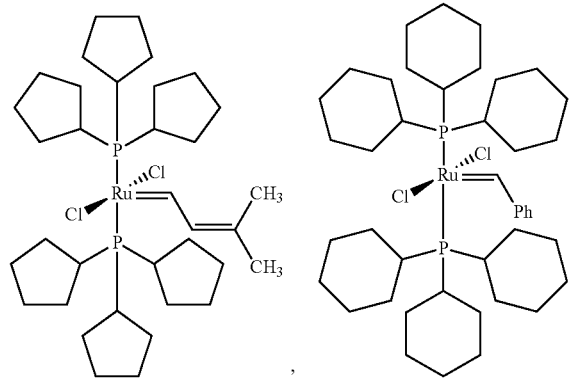
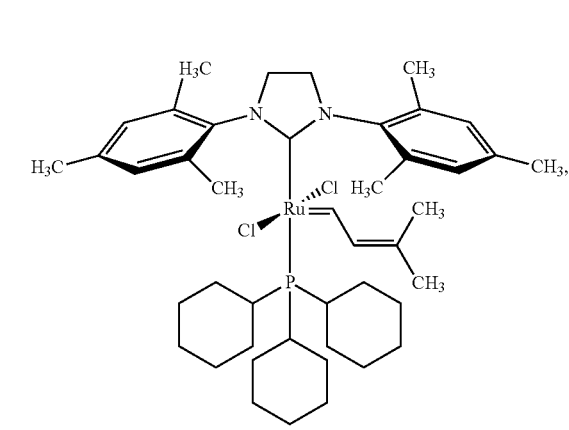
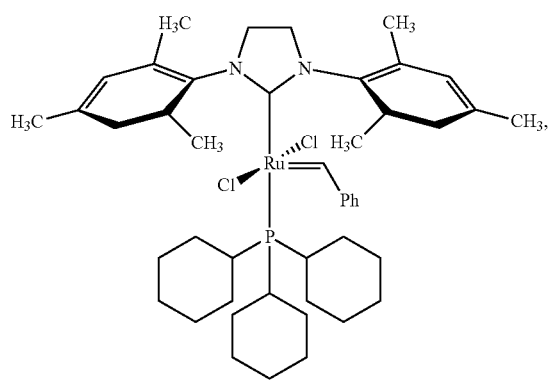
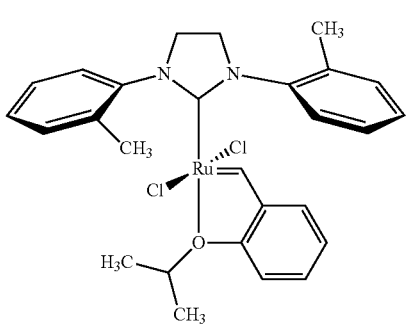
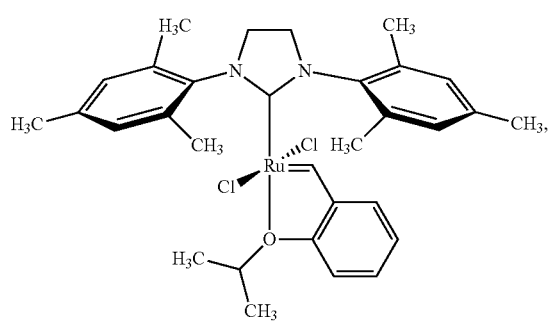
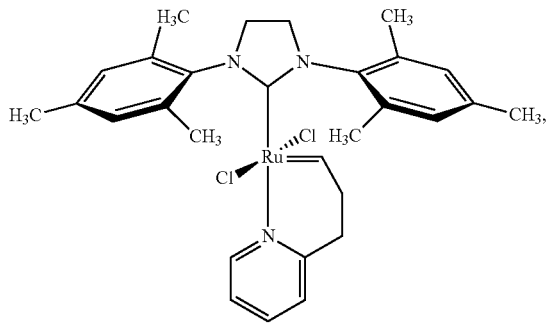

-continued

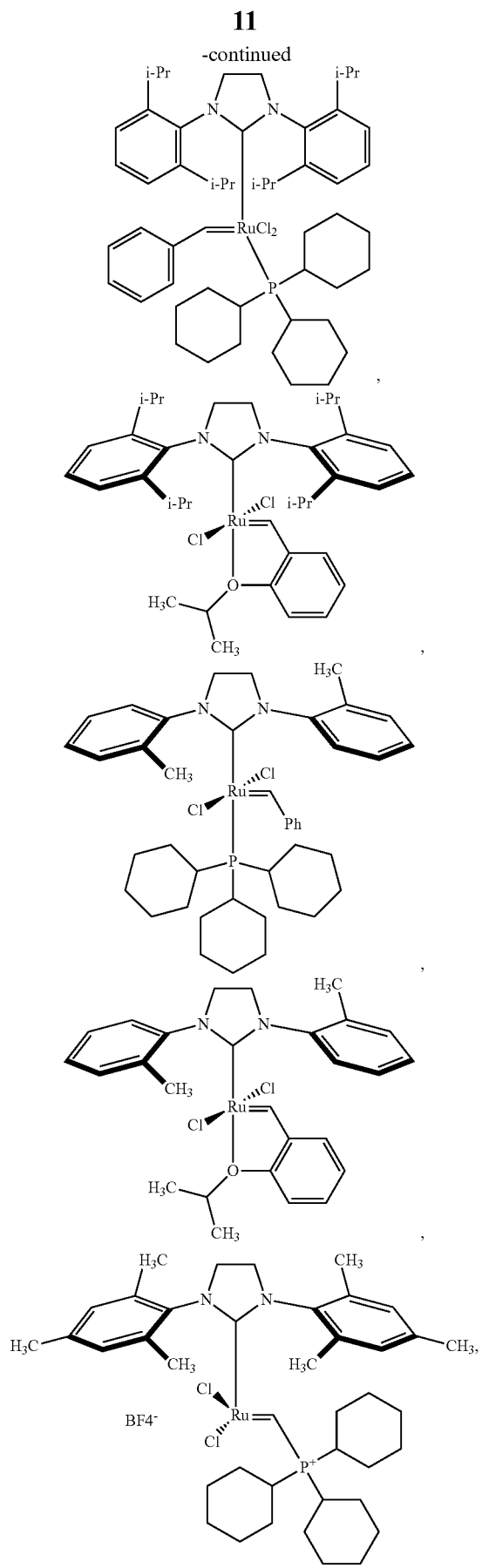

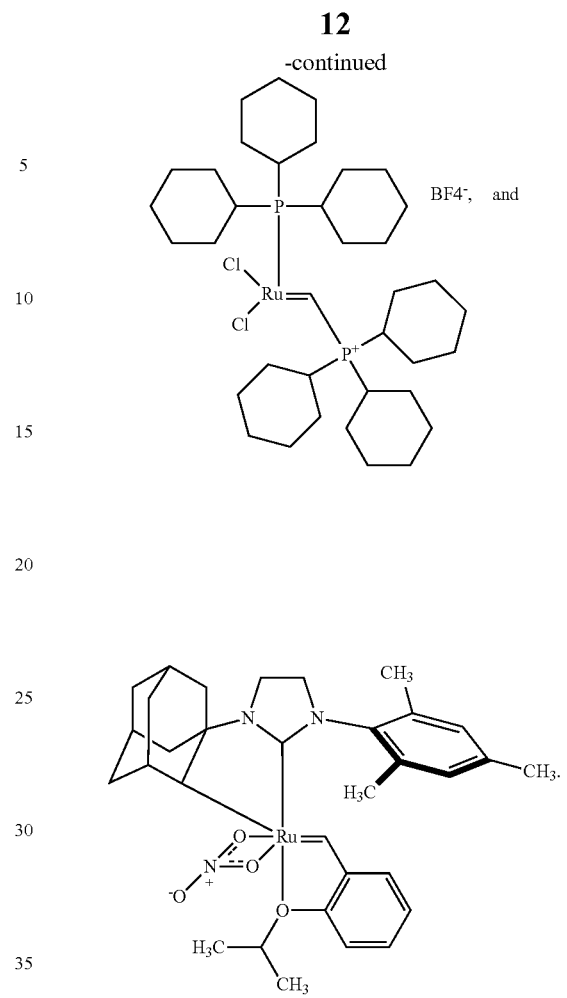

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

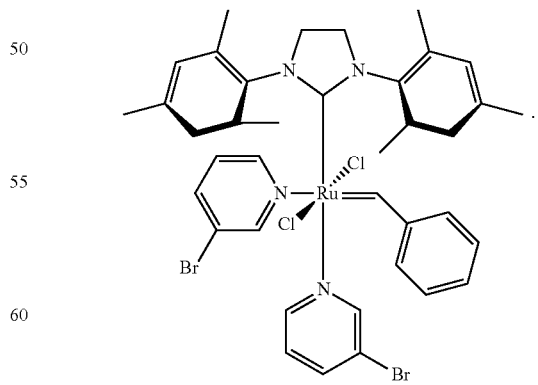

The above third generation Grubbs catalyst (G3) may be obtained commercially or prepared from a Grubbs second generation catalyst (G2) as follows:

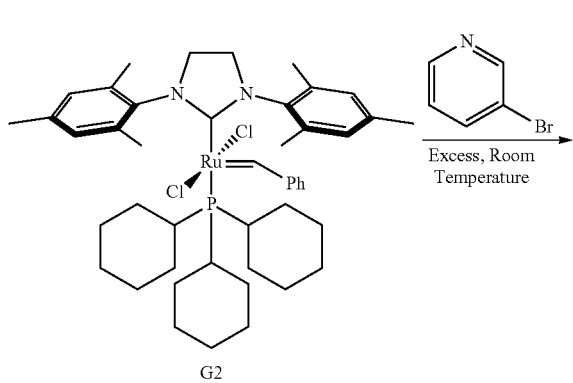

G2

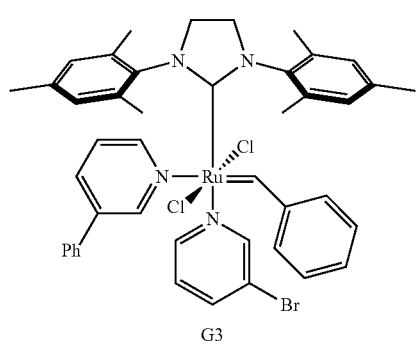

G3

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of the polymer, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The polymer can be isolated by a suitable technique, for example, precipitation with a nonsolvent.

The polymer can be characterized for its molecular weight and molecular weight distribution by any known techniques. For example, a MALS-GPC technique can be employed.

The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers of the invention are highly monodisperse. For example, the copolymers have an Mw/Mn of 1.05 to 1.5, preferably 1.1 to 1.2.

In accordance with an embodiment, polycyclooctadiene (Poly(COD) or PCOD)) can be obtained by polymerizing COD by a ROMP catalyst, followed by termination of the polymerization, as illustrated below:

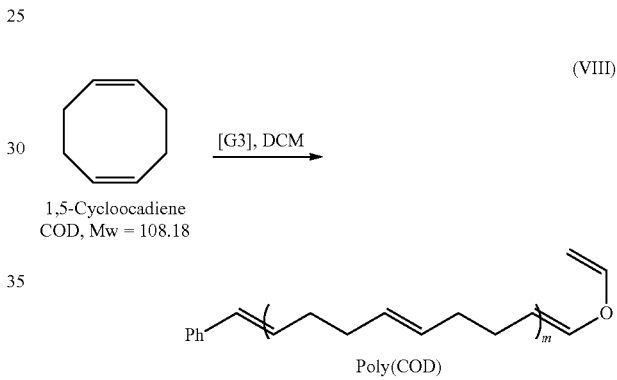

In the above method, polymerization can be terminated in a suitable manner, for example, by the use of alkyl vinyl ether such as ethyl vinyl ether.

In accordance with another embodiment, telechelic Poly-COD can be prepared using ROMP as illustrated below:

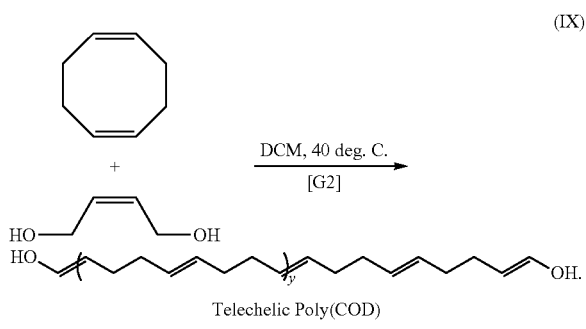

The telechelic Poly(COD) can be further modified to provide a telechelic Poly(COD) having multiple hydroxyl groups. For example, the above telechelic Poly(COD) can be reacted with hydroxymethyl ethylene oxide to obtain a telechelic Poly(COD) having multiple hydroxyl groups, as illustrated below:

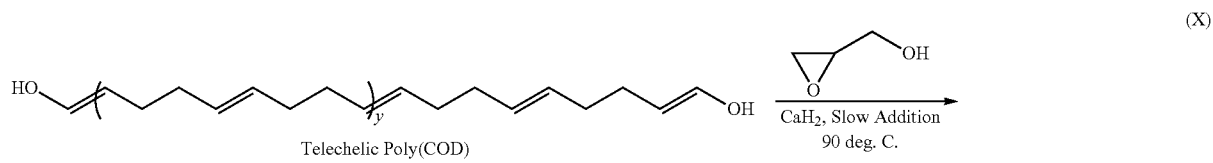
(X)
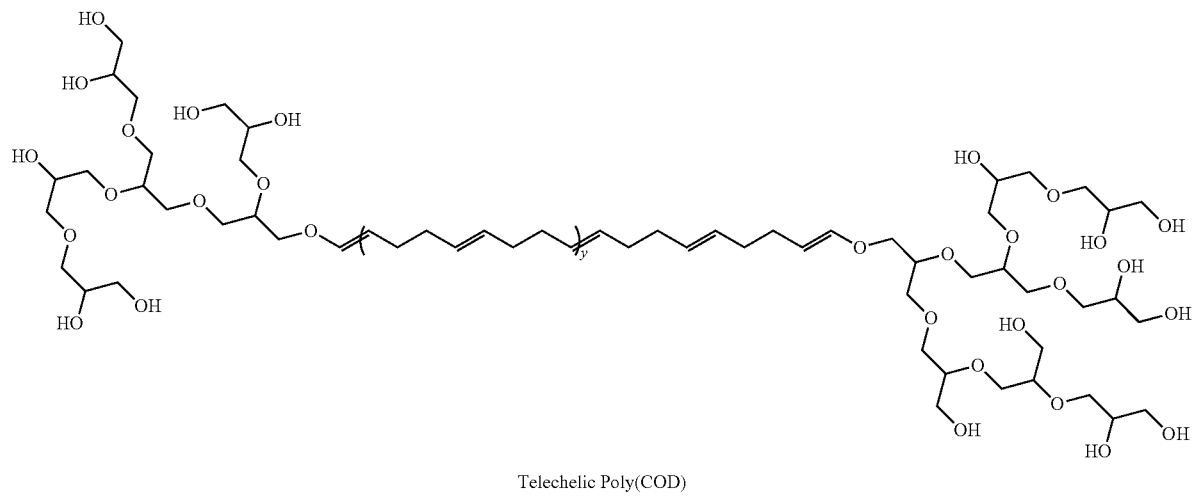
Telechelic Poly(COD)
For adhesion to porous fluoropolymer supports, e.g., PTFE, a fluorophilic part is provided by reaction with a fluorinated thiol. A hydrophilic functionality can be added through a hydrophilic mono-thiol. The reactions are illustrated below:
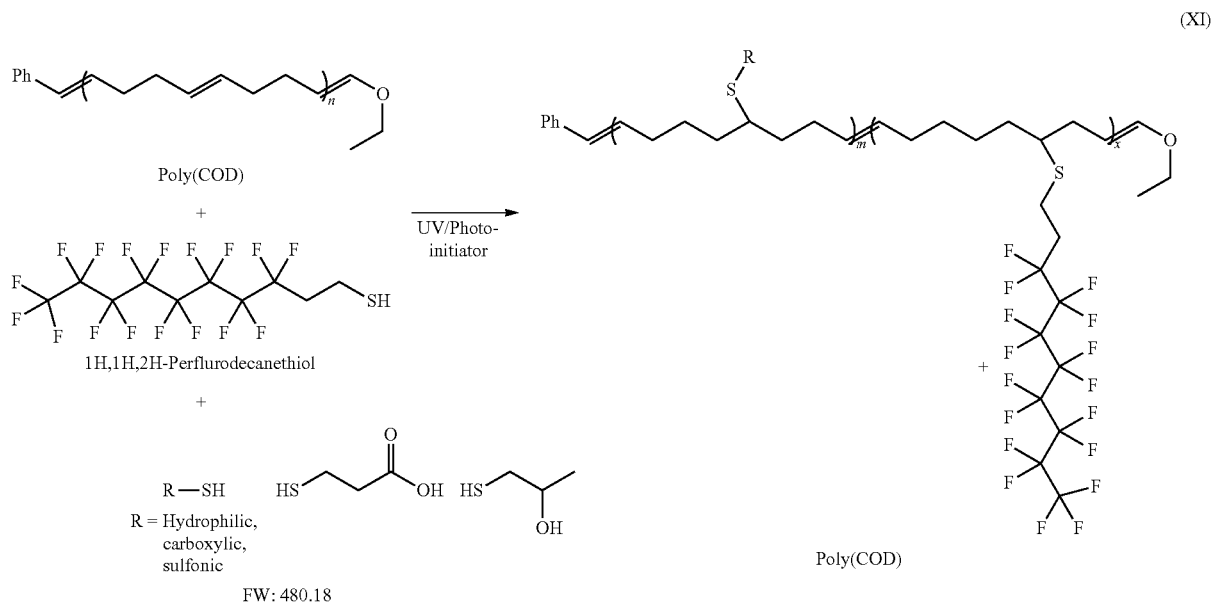
(XI)
where m + x = n -continued
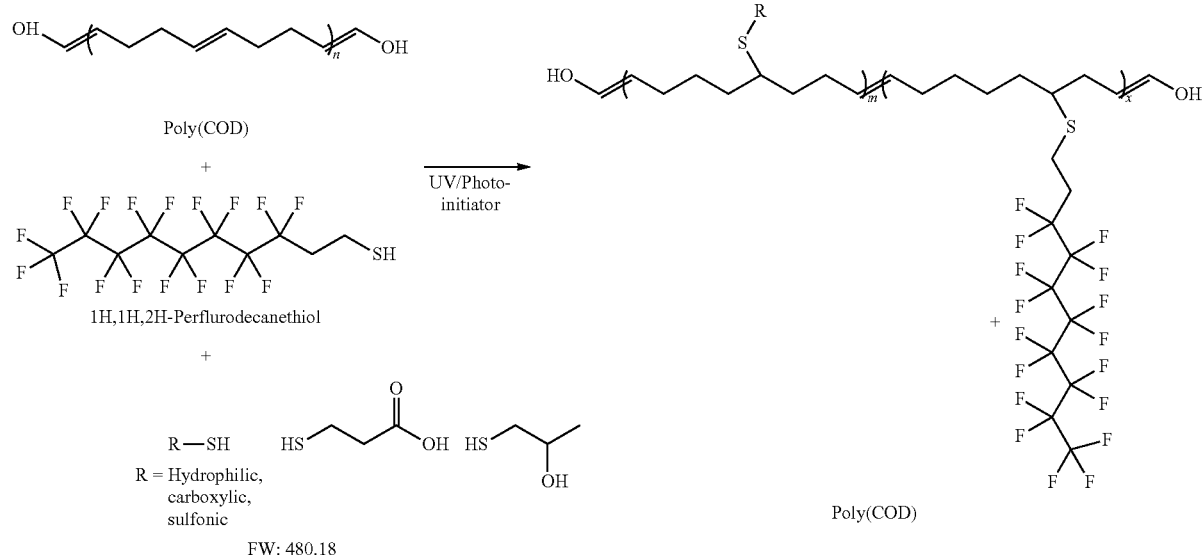
In accordance with an another embodiment, telechelic Poly(COD) can modified as follows:
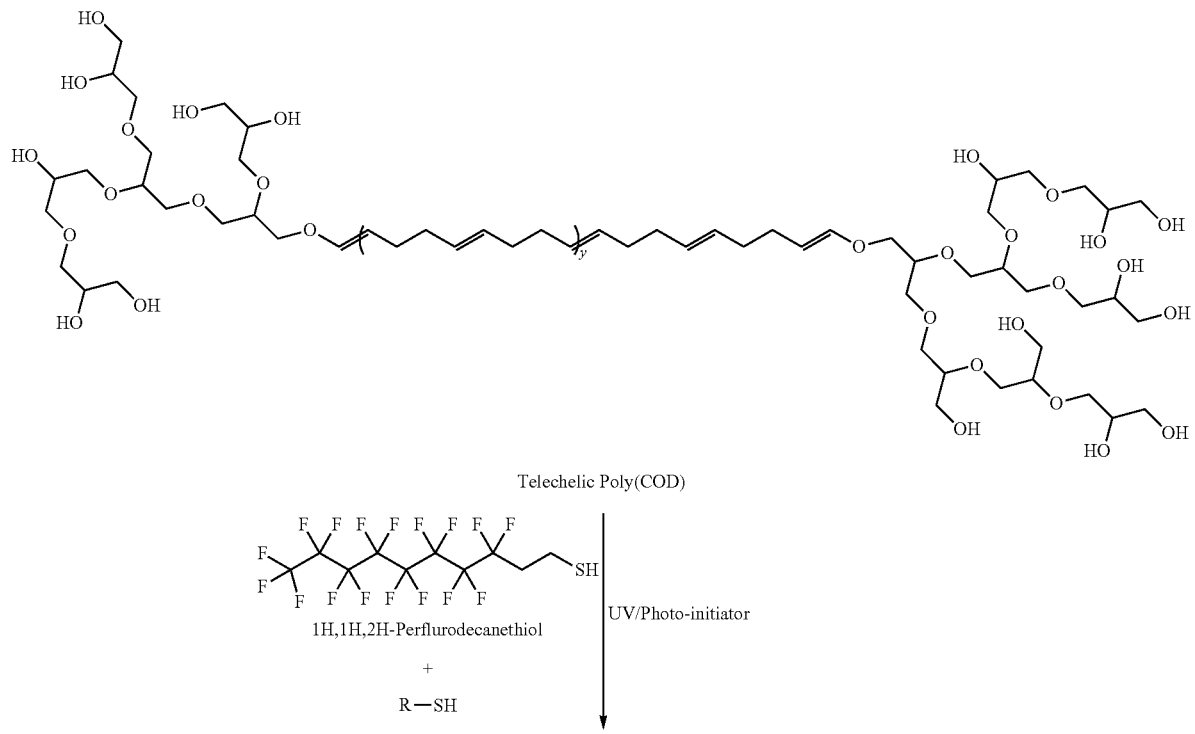

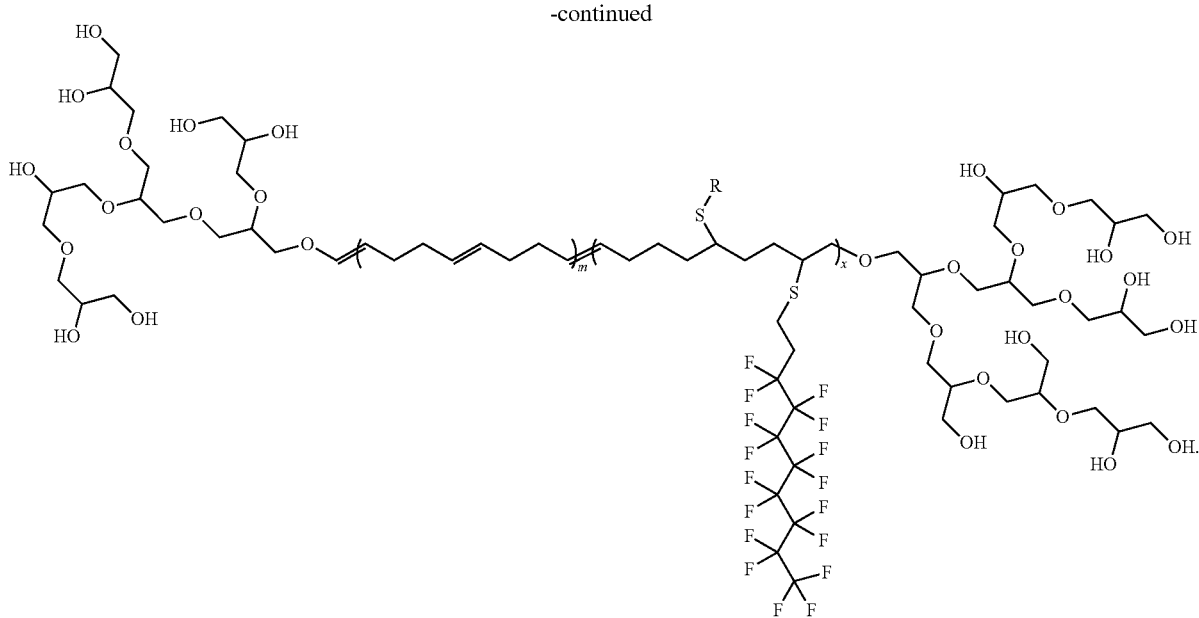

Functional Linear hyper branched Poly(COD)

where m + x = y + 1

The above structure results from the modification of the hyper-branched P(gly-COD-gly) system and is generated in situ on the membrane during the crosslinking step.

Alternatively, the invention provides a modified linear dendritic Poly(COD) of the formula:

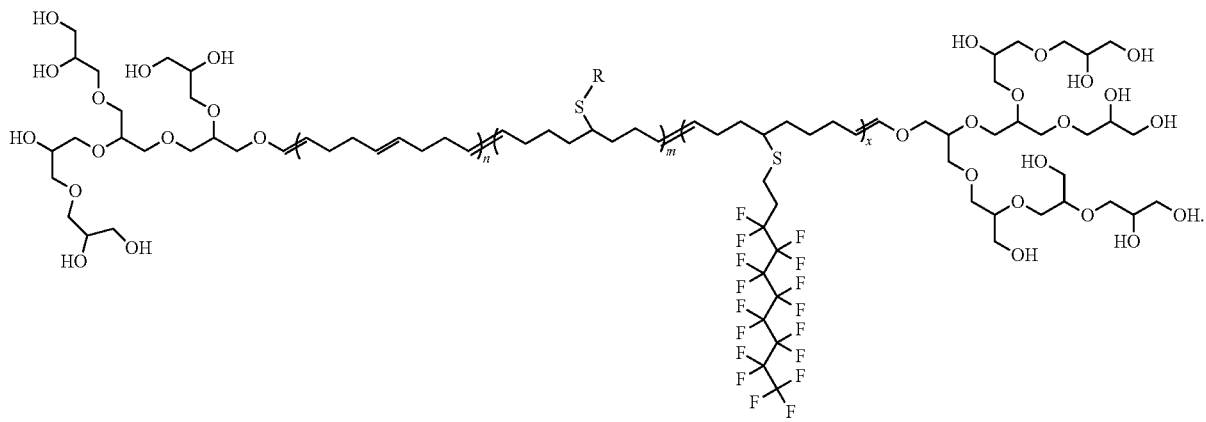

(VII)

where n + m + x = y + 1

The hyper-branched PCOD is first reacted with glycidol, and the reaction product is modified by the introduction of both the hydrophilic and fluorinated side chain. The thiol-ene reaction introduces both the hydrophilic and fluoro side chain to the PCOD backbone. Either a sequential reaction to react the fluoro side chain with PCOD followed with the hydrophilic component or a mixture of both are reacted with PCOD to introduce both at the same time.

The molecular weight of the PCOD system is tuned so as to provide enough double bonds for the thiolene functional groups and crosslinking as well.

The present invention further provides a composite hydrophilic membrane comprising a porous fluoropolymer and a copolymer or a modified homopolymer as described above, wherein the copolymer or modified homopolymer is optionally crosslinked.

Figure 2:
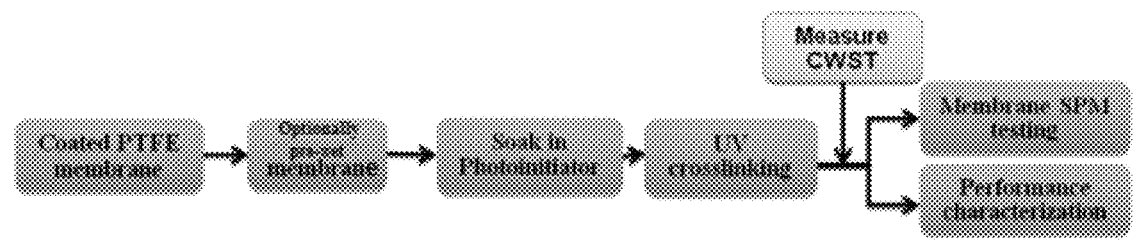
FIG. 2 illustrates a process for coating and crosslinking the hydrophilic fluorinated polymer in accordance with an embodiment of the invention.

The surface tension of the resulting porous membrane can be determined as follows. For example, a sheet of PTFE membrane is coated at room temperature by optionally pre-wetting the membrane sheet with IPA solvent and soaking the membrane in polymer solution with concentration that ranges between 0.1% and 10% by mass. The PTFE sheet coating time ranges between 1 min and 12 hours. After soaking the membrane, the membrane is dried in convection oven at 100° C. to 160° C. The drying time ranges between 10 minutes and 12 h. The PTFE membrane wetting characteristics are measured by measuring the critical wetting surface tension. A process for coating and crosslinking is illustrated in FIG. 1. FIG. 2 illustrates a method of crosslinking the coating on a porous fluoropolymer support in accordance with an embodiment of the invention.

The change in surface modification in terms of surface tension was measured by a method that was developed to measure porous membrane surface tension rather than solid surface. The method relies on a set of solutions of certain composition. Each solution has specific surface tension. The solutions surface tension ranges from 25 to 92 dyne/cm in small non-equivalent increments. To measure membrane surface tension, it is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is <10 seconds. If the time >10 seconds, the solution is considered to partially wet the membrane.

Crosslinking can be carried out by any suitable method, for example, by the use of a photoinitiator and a high energy radiation, e.g., UV. It is contemplated that the crosslinking would provide a highly stable polymer network in the membrane.

The crosslinking can be carried out as follows. The polymer coated PTFE sheets are pre-wet with IPA, the sheets are then washed with the solvent with which the photoinitiator is prepared in to exchange IPA with that solvent. The sheets are then soaked in a solution of photo-initiator with certain concentration for a certain time followed by exposure to UV irradiation. The soaking time in photoinitiator solution ranges from 1 minute to 24 hours. The UV irradiation time ranges from 30 seconds to 24 hours. The membrane critical wetting surface tension (CWST), performance characterization, and/or SPM testing are then measured. "SPM" means hot sulfuric acid hydrogen peroxide mixture ($H_2SO_4$ (96%): $H_2O_2$ (30%) of 80:20 by volume) at 120 to 180° C.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 µm and 10 µm.

Hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough).

Membranes according to embodiments of the inventions can be used in a variety of devices, including surgical devices and products, such as, for example, ophthalmic surgical products.

In accordance with embodiments of the invention, the hydrophilic fluoropolymer porous membrane can have a variety of configurations, including planar, flat sheet, pleated, tubular, spiral, and hollow fiber.

Hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluoropolymer porous membrane comprises any suitable porous fluoropolymer support, for example, a support made from PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane. The porous support can have any suitable pore size, e.g., from about 10 nm to about 10 microns, preferably PTFE and PVDF.

The present invention further provides a hydrophilically modified fluoropolymer membrane produced by the method described above.

The present invention further provides a method of filtering a fluid, the method comprising passing the fluid through the hydrophilic fluoropolymer membrane described above.

The following examples further illustrate the invention but, of course, should not be construed as in any way limiting its scope.

Example 1

Materials: The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use. 1,5-Cyclooctadiene (COD) was purified by vacuum distillation from boron trifluoride and used fresh.

Example 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

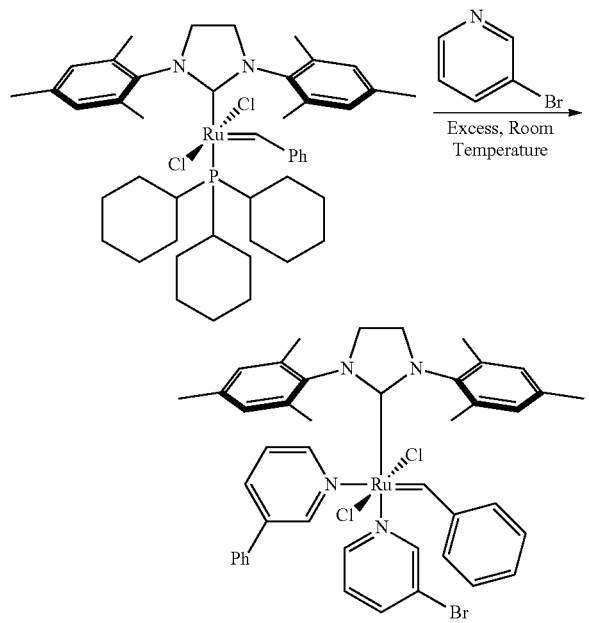

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

Example 3

This example illustrates the gel permeation chromatographic characterization of the homopolymer and copolymers in accordance with an embodiment of the invention.

The homopolymer and block copolymer obtained was characterized for their molecular weight and molecular weight distribution properties by the MALS-GPC technique under the following conditions:

Mobile phase: Dichloromethane (DCM).
Mobile phase temperature: 30° C.
UV wavelength: 245 nm.
Columns used: three PSS SVD Lux analytical columns (styrene-divinylbenzene copolymer network), columns having as stationary phase beads of diameter 5 µm and pore sizes of 1000 A, 100,000 A, and 1,000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

Example 4

This example illustrates a method of synthesis of Polycyclooctadiene (P-COD) in accordance with an embodiment of the invention.

In a 50 ml round-bottomed flask equipped with a stir bar, Grubb's second generation catalyst (3.0 mg, 0.004 mmol), 2-butene-1,4-diol (10.0 mg, 0.12 mmol) and 1,5-cyclooctadiene (490 mg, 4.54 mmol) were combined and degassed with argon for 5 min and transferred to an oil bath at 40° C. Heating was continued for 1 h followed by the addition of the remaining 1,5-cyclooctadiene (4.5 mg, 4.2 mmol) in 5 ml of DCM to the mixture and continued heating for another 6 h. The hydroxyl terminated polymer (P-COD) was isolated by precipitation in methanol. $^1$H-NMR (300 MHz, CDCl$_3$): δ (ppm) 5.3 to 5.5 (s, broad, 1H), 1.75 to 2.5 (s, broad).

Example 5

This example illustrates a method of synthesis of a telechelic polymer having glycidyl terminal groups of the formula (X), Poly(gly-hb-COD-hb-gly), in accordance with an embodiment of the invention.

In a 50 ml round-bottomed flask equipped with a stir bar, telechelic polycyclooctadiene (hydroxy terminated) (1.0 g) was dissolved in diglyme at 90-100° C. The hydroxyl group was activated with CaH$_2$ (0.5 g) with stirring for 1 h. Glycidol (10.0 g, 135 mmol) was added to the mixture drop wise over 30 min. The reaction was continued to be heated for 12 h. the polymer was isolated by precipitation in hexane. $^1$H-NMR (CDCl$_3$): δ (ppm) 5.6 (s 1H), 5.45 to 5.3 (m broad), 2.4 (s 2H), 2.2 to 1.9 (m broad).

Example 6

This example illustrates a method of post-functionalization of Polycyclooctadiene and a hyperbranched block copolymer thereof with a fluorine-containing reagent.

Either PCOD homopolymer or the copolymer of formula A is post functionalized with 1H,1H,2H,2H-Perfluorodecanethiol in the presence of photoinitiator under UV irradiation by following substantially the same process. For example, PCOD (1.0 g) is dissolved in tetrahydrofuran containing up to 15% by mass of Irgacure 2959 photoinitiator (1-[4-(2-Hydroxyethoxy)-phenyl]-2-hydroxy-2-methyl-1-propane-1-one). The solution is exposed to UV irradiation (300-480 nm, 150-250 mWatt, 60 to 180 seconds). The reaction mixture is used in the PTFE coating and crosslinking processes.

Example 7

This example illustrates the coating and crosslinking procedure of PCOD and Poly(gly-hb-COD-hb-gly) on a PTFE porous support.

The coating and crosslinking procedures for the fluorinated PCOD or fluorinated Poly(gly-hb-COD-hb-gly) hyperbranched-block polyglycerol are substantially the same. The following example is based on fluorinated PCOD.

A porous PTFE membrane is coated with either fluorinated PCOD modified via thiol-ene reaction by soaking the membrane in a solution containing the following: Fluorinated PCOD (1 to 10% mass concentration) in THF, photoinitiator (Irgacure, 1 to 15% mass), sodium salt of 3-mercaptoethanesurfonic acid (1 to 15% mass, neutralized in aqueous THF with dilute HCl solution (1N) till forming homogenous solution in THF), the membrane is crosslinked with this mixture with UV irradiation (300-480 nm, 150-250 mWatt, 60 second to 180 second). The membrane was then washed with DI water and dried at 100° C. for 10 min.

Figure 3:
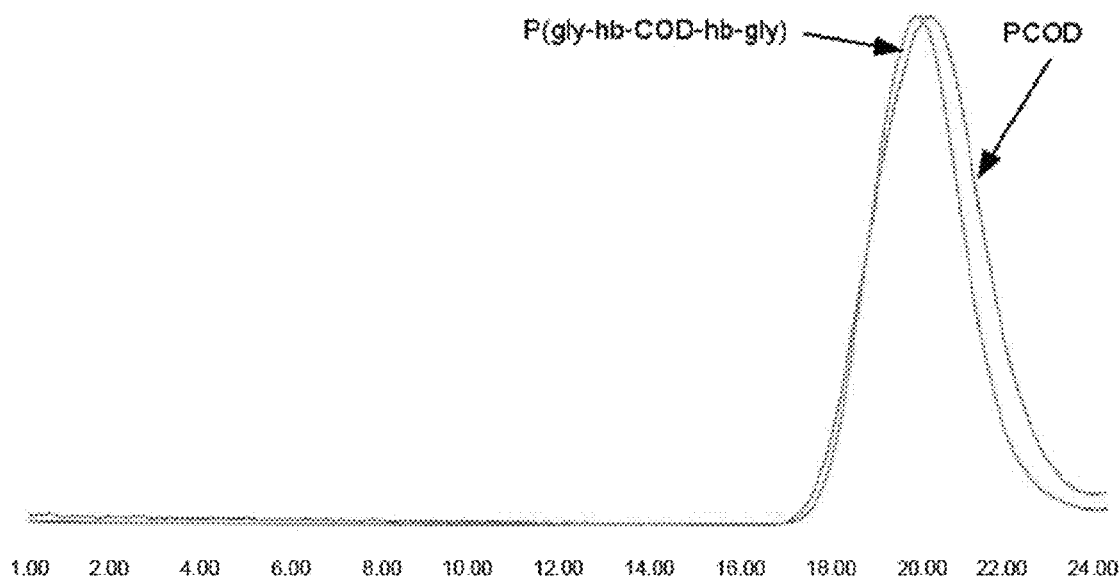
FIG. 3 depicts the GPC traces of Poly(COD) and Poly(gly-hb-COD-hb-gly) in $CH_2Cl_2$.

The GPC traces of PCOD and P(gly-hb-COD-hb-gly) are depicted in FIG. 3.

P(gly-hb-COD-hb-gly) was in situ reacted with 1H,1H, 2H,2H-Perfluorodecanethiol in the presence of photoinitiator (Irgacure 2959, 10%) under UV irradiation (90 seconds). The resulting polymer mixture was used to coat PTFE membrane and measure CWST by following the same process discussed above. The CWST of the PTFE and treated PTFE surfaces are illustrated in Table 1.

TABLE 1

| | CWST values | |
|---|---|---|
| | CWST (dynes/cm) | |
| Coating ID | Instant | Timed 10"-15" |
| PTFE native | 25.4 | 25.4 |
| PTFE PCOD treated-1 | 33 | 35 |
| PTFE P(gly-hb-COD-hb-gly) treated-1 | 37 | 39 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a crosslinked polymer network, wherein the composite hydrophilic membrane is produced by coating the porous fluoropolymer support with a coating composition comprising a solvent, a crosslinking agent, a photoinitiator, and a telechelic polymer comprising a backbone made of polymerized 1,5-cyclooctadiene repeat units, wherein at least one of said repeat units comprises a pendant hydrophilic group attached thereto and at least another one of said repeat units comprises a pendant fluorinated hydrophobic group attached thereto, and crosslinking in situ the resulting coating.

2. The composite hydrophilic porous membrane of claim 1, wherein the telechelic polymer comprises hydrophobic and/or hydrophilic terminal end groups.

3. The composite hydrophilic porous membrane of claim 1, wherein the telechelic polymer comprises repeat units B and C, and optionally one or more repeat units A, wherein the repeat units A-C are of the formulae:

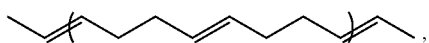
(A)

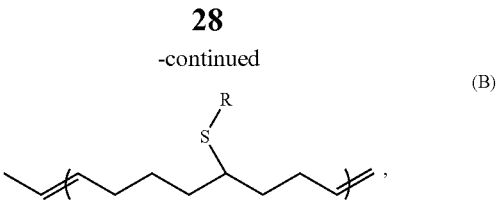
(B)

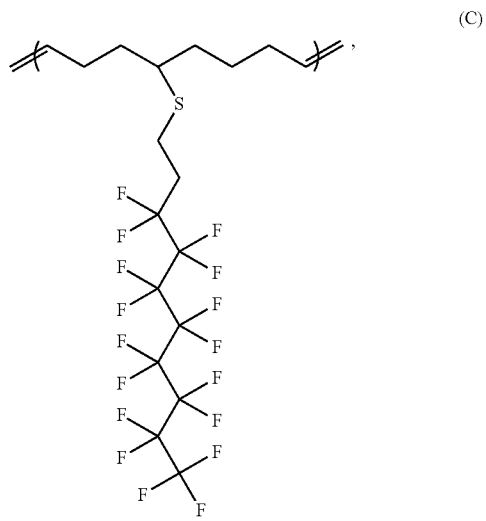
(C)

wherein R is a hydrophilic group.

4. The composite hydrophilic porous membrane of claim 3, wherein R is selected from carboxy alkyl, sulfonic alkyl, and hydroxyalkyl groups.

5. The composite hydrophilic porous membrane of claim 3, which comprises repeat units A, B, and C.

6. The composite hydrophilic porous membrane of claim 1, which has hydrophobic terminal end groups.

7. The composite hydrophilic porous membrane of claim 1, wherein the telechelic polymer is of the formula:

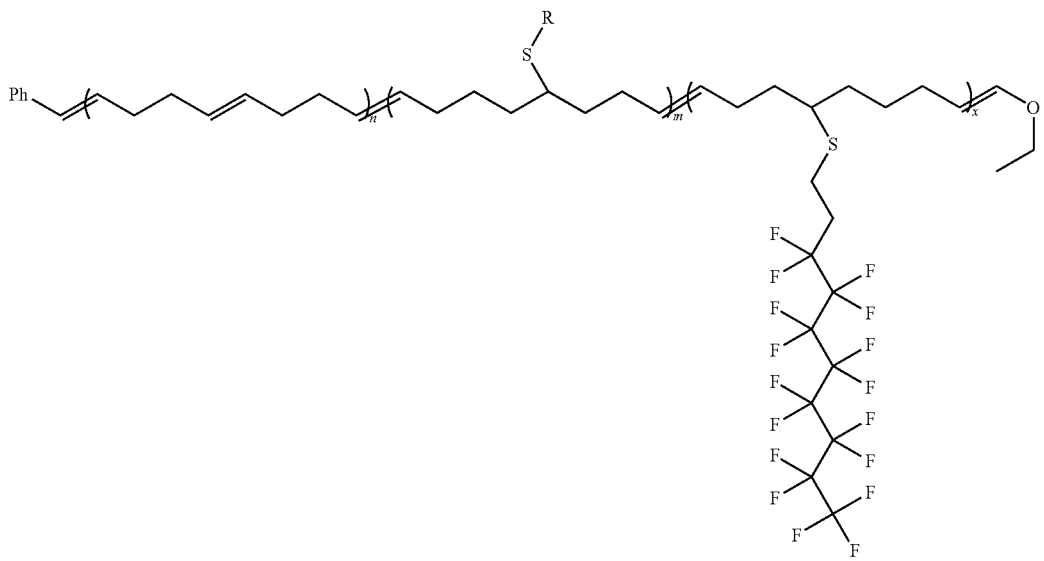

wherein x and m are individually up to 35 mole % of n+m+x, wherein n+m+x=from 10 to 1000, and n and m are individually from about 10 to about 1000, and R is a hydrophilic group.

8. The composite hydrophilic porous membrane of claim 5, wherein the telechelic polymer comprises hydrophilic terminal end groups.

9. The composite hydrophilic porous membrane of claim 8, wherein the telechelic polymer has the following formula:

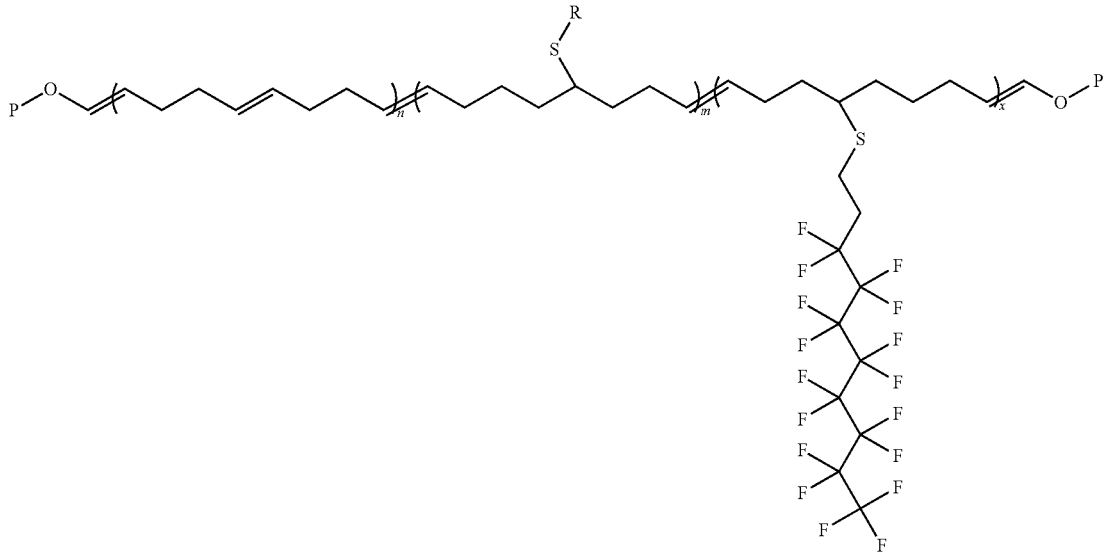

wherein P is a group capable of initiating polymerization, x and m are individually up to 35 mole % of n+m+x, wherein n+m+x=from 10 to 1000.

10. The composite hydrophilic porous membrane of claim 9, wherein R is selected from carboxy alkyl, sulfonic alkyl, and hydroxyalkyl groups.

11. The composite hydrophilic porous membrane of claim 1, wherein the crosslinking agent is a bithiol or a multithiol.

12. The composite hydrophilic porous membrane of claim 9, wherein the telechelic polymer is of the formula:

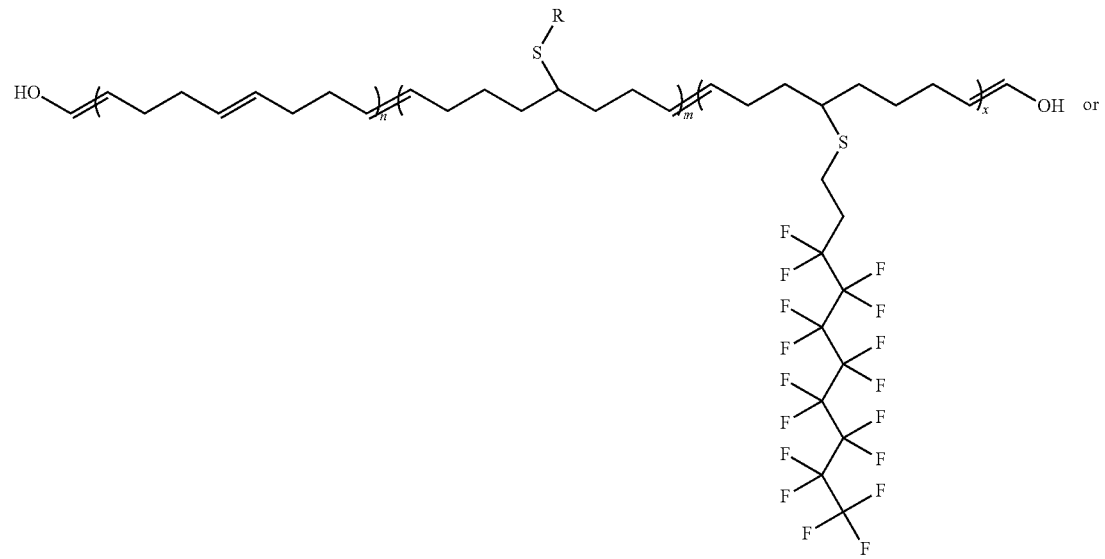

or

-continued

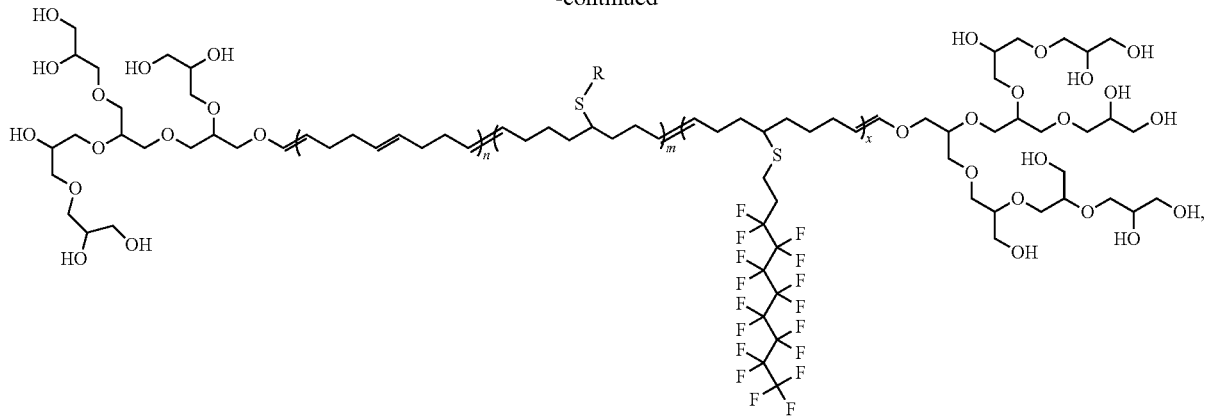

wherein x and m are individually up to 35 mole % of n+m+x, wherein n+m+x=from 10 to 1000.

13. The composite hydrophilic porous membrane of claim 1, wherein the photoinitiator is selected from camphor quinone, benzophenone, benzophenone derivatives, acetophenone, acetophenone derivatives, phosphine oxides and derivatives, benzoin alkyl ethers benzil ketals, phenylglyoxalic esters and derivatives thereof, dimeric phenylglyoxalic esters, peresters, halomethyltriazines, hexaarylbisimidazole/coinitiators systems, ferrocenium compounds, titanocenes, and combinations thereof.

14. The composite hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

15. The composite hydrophilic porous membrane of claim 1, wherein the crosslinking of the coating is carried by exposing the coating to UV radiation.

* * * * *